(12) United States Patent
Cook

(10) Patent No.: US 10,308,266 B2
(45) Date of Patent: *Jun. 4, 2019

(54) ERGONOMIC SAFETY SOLUTION FOR ORBITAL DRILLS

(71) Applicant: The Boeing Company, Chicago, IL (US)

(72) Inventor: Rebecca Cook, North Charleston, SC (US)

(73) Assignee: The Boeing Company, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/957,389

(22) Filed: Apr. 19, 2018

(65) Prior Publication Data

US 2018/0237044 A1    Aug. 23, 2018

Related U.S. Application Data

(63) Continuation of application No. 15/163,980, filed on May 25, 2016, now Pat. No. 9,975,564.

(51) Int. Cl.
*B62B 5/06*    (2006.01)
*B62B 1/12*    (2006.01)
*B62B 1/26*    (2006.01)
*B62B 1/14*    (2006.01)

(52) U.S. Cl.
CPC ............. *B62B 1/125* (2013.01); *B62B 1/14* (2013.01); *B62B 1/26* (2013.01); *B62B 5/067* (2013.01); *B62B 2202/48* (2013.01); *B62B 2203/60* (2013.01)

(58) Field of Classification Search
CPC B62B 5/06; B62B 5/065; B62B 5/067; E21B 19/087
See application file for complete search history.

(56) References Cited

U.S. PATENT DOCUMENTS 4,979,578 A * 12/1990 Landry ................. E21B 19/087
                                                      173/170
2006/0273537 A1 * 12/2006 Robens ................... B05B 9/007
                                                      280/47.24

* cited by examiner

*Primary Examiner* — Bryan A Evans
(74) *Attorney, Agent, or Firm* — Felix L. Fischer

(57) ABSTRACT

A tool hand cart incorporates a body with a pair of wheels rotatably mounted on opposite sides of the body proximate a lower rear edge of the body. A collapsible handle is retractably extendable upward from the body. A pair of arms having vertically oriented channels extends from a front of the body and are arranged in spaced relation to define opposing first and second slots configured to receive side frame members of a drill. The handle is retractable to a first position enhancing insertion of the drill and extendible to a second position and the body is configured to tilt from an upright standing position to a canted position in which the body is supported by the pair of wheels and rolled by pulling the handle to thereby transport a drill positioned in the first and second slots.

20 Claims, 10 Drawing Sheets

ERGONOMIC SAFETY SOLUTION FOR ORBITAL DRILLS

REFERENCES TO RELATED APPLICATIONS

This application is a continuation of application Ser. No. 15/163,980 having a filing date of May 25, 2016 entitled ERGONOMIC SAFETY SOLUTION FOR ORBITAL DRILLS having a common assignee with the present application, the disclosure of which is incorporated herein by reference.

BACKGROUND INFORMATION

Field

Embodiments of the disclosure relate generally to ergonomic tools for movement of machining equipment and more particularly to a cart employing side and bottom engagement elements to receive an orbital drill frame, the cart having a retractable handle to provide for ease in insertion of the orbital drill into the cart.

Background

Orbital drills for modern machining are quite massive. The weight of a typical drill may exceed allowable standard ergonomic lifting weight requirements particularly for extended carrying of the drill. However, the orbital drills must be moved on a regular basis between machines, between tool crib and machine, or for maintenance/metrology requirements.

It is therefore desirable to provide a cart to receive an orbital drill for movement within a shop.

SUMMARY

Exemplary embodiments provide a tool hand cart incorporating a body with a pair of wheels rotatably mounted on opposite sides of the body proximate a lower rear edge of the body. A collapsible handle is retractably extendable upward from the body. A pair of arms having vertically oriented channels extends from a front of the body and are arranged in spaced relation to define opposing first and second slots configured to receive side frame members of a drill. The handle is retractable to a first position enhancing insertion of the drill and extendible to a second position and the body is configured to tilt from an upright standing position to a canted position in which the body is supported by the pair of wheels and rolled by pulling the handle to thereby transport a drill positioned in the first and second slots.

The embodiments disclosed provide a method for ergonomically moving an orbital drill wherein a telescopically retractable handle is retracted into the body of a cart to a first position. A frame of an orbital drill is received vertically in slots in arms extending from the body of the cart. The cart rests with stability on a base extending from a bottom surface of the cart. The handle is extended telescopically to a second position. The toes of an operator are received in a toe relief for leverage and the cart is canted rearwardly on a pair of wheels mounted proximate a lower rear edge of the body for rolling transport of the orbital drill.

BRIEF DESCRIPTION OF THE DRAWINGS

The features, functions, and advantages that have been discussed can be achieved independently in various embodiments of the present disclosure or may be combined in yet other embodiments, further details of which can be seen with reference to the following description and drawings.

DETAILED DESCRIPTION

Figure 1:
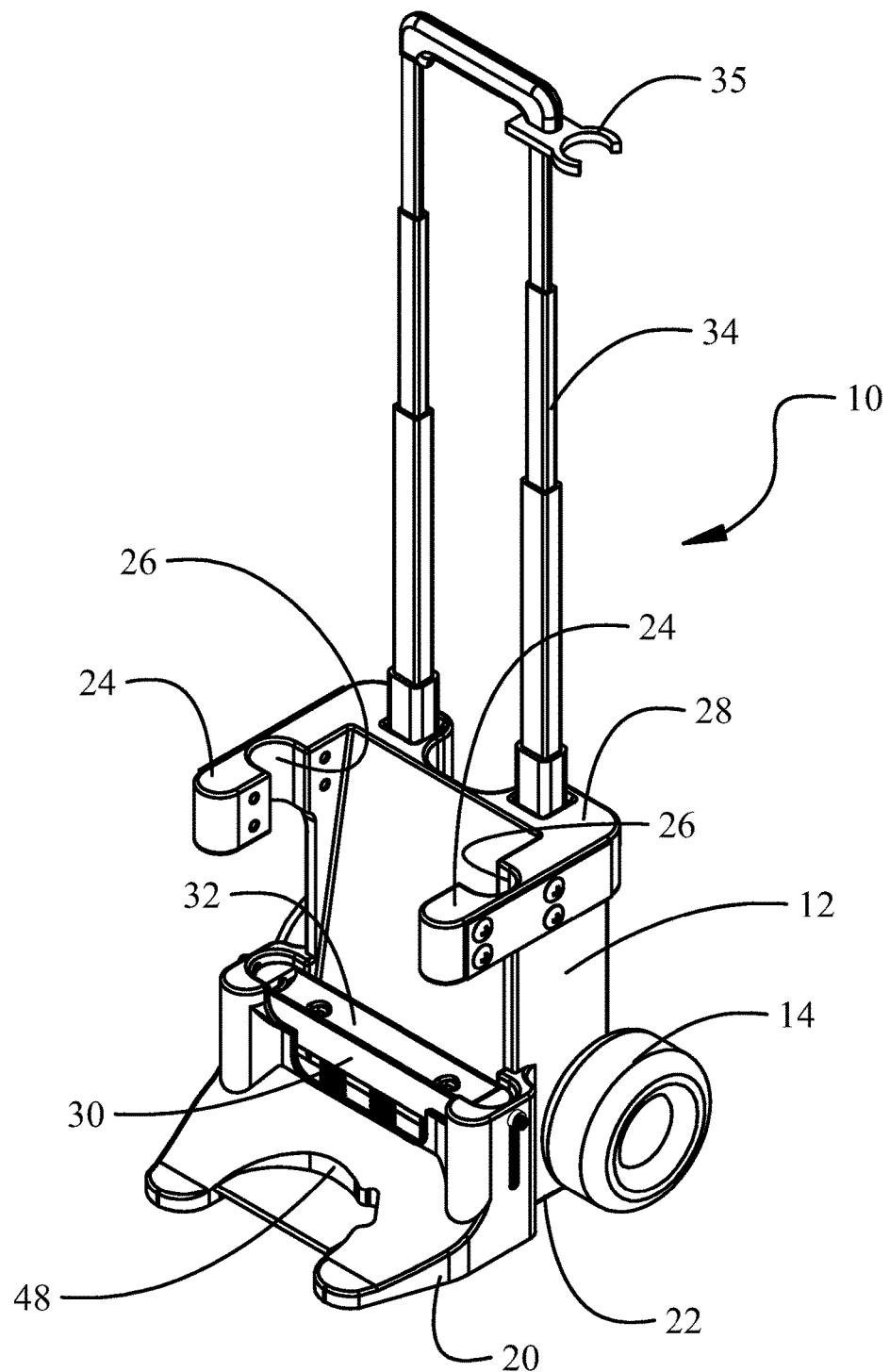
FIG. 1 is a front pictorial representation of an exemplary embodiment of a tool hand cart.

An exemplary embodiment of a tool hand cart 10 for transporting orbital drills is shown in FIG. 1. The cart 10 incorporates a body 12. For the embodiment shown the body 12 is substantially rectangular in cross section. In alternative embodiments other geometric cross sections may be employed. A pair of wheels 14 are attached to the body proximate a lower rear edge 16 (best seen in FIG. 3). An axle extending through the body 12 or stub axles attached to sides 18 of the body may be employed for rotational engagement of the wheels 14. A forward base 20 extends forward from the body 12 opposite the wheels 14 and substantially flush with a bottom surface 22 of the body. Placement of the wheels 14 proximate the lower rear edge 16 of the body allows the cart 10 to be canted back to roll on the wheels in a manner comparable to standard utility dollies. The forward base 20 extends forward from the body sufficiently to allow the cart 10 to supportably stand upright on the base and body bottom.

Arms 24 extend from the body 12 and contain substantially vertically oriented channels 26. For the embodiment shown, the arms are located proximate a top surface 28 of the body 12 and have limited vertical dimension. In alternative embodiments the vertical dimension of the arms may be greater and may extend substantially the entire vertical dimension of the body. A nose support 30 is supported in the body 12 and incorporates a horizontal channel 32 substantially aligned with the vertically oriented channels 26 (as best seen and described with respect to FIGS. 5 and 6 subsequently). For the exemplary embodiment the vertically oriented channels in the arms and the horizontal channel are semicylindrical to accommodate an orbital drill having cylindrical frame members.

Figure 2:
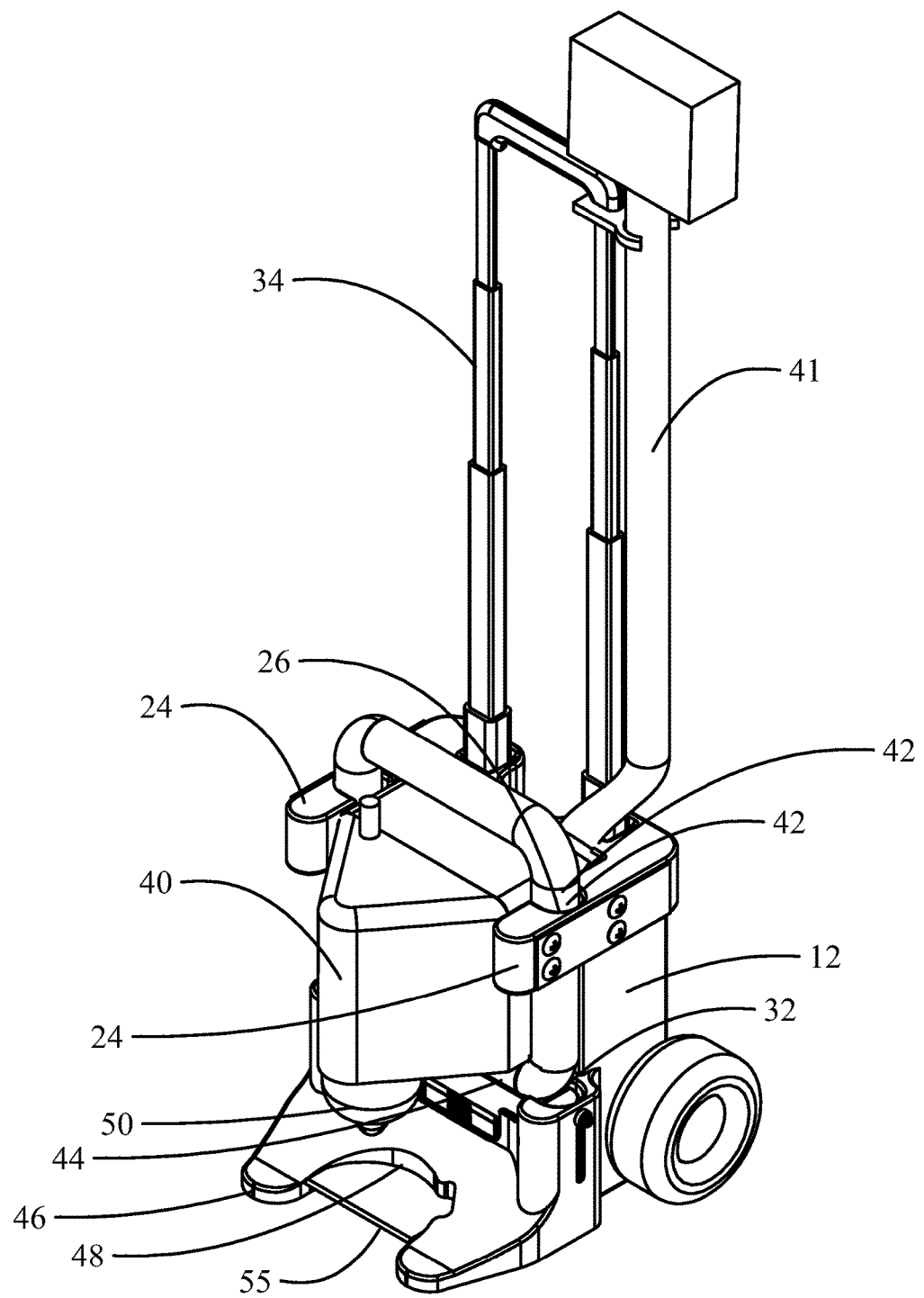
FIG. 2 is a pictorial representation of the tool hand cart of FIG. 1 with an orbital drill inserted to be carried.
Figure 3:
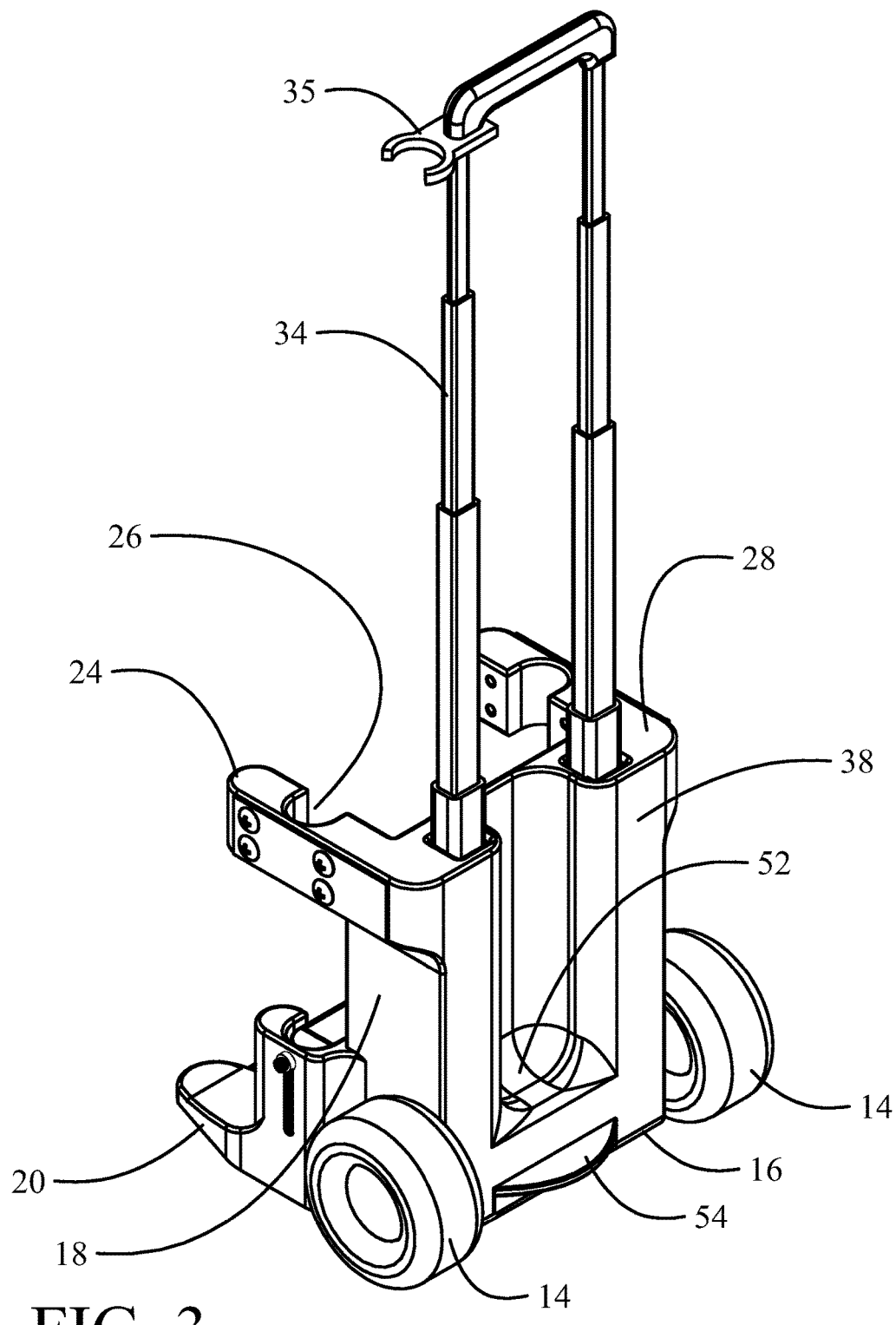
FIG. 3 is a rear pictorial representation of the embodiment of FIG. 1.

A handle 34 telescopically extends from the upper surface 28 of the body 12, proximate a rear surface 38 (best seen in FIG. 3). A clip 35 extends laterally from the handle 34 to engage an umbilical 41 extending from the orbital drill 40 as shown in FIG. 2

As seen in FIG. 2, the cart 10 is adapted to carry an orbital drill 40 having a frame with side members 42 and a bottom member 44 and an extending power umbilical 41. The side members 42 are slidably received in the vertically oriented channels 26 in the arms 24. The bottom member 44 is received in the horizontal channel 32 which supports the weight of the drill. The nose support 30 is substantially centrally located between the wheels and a forward edge 46 of the forward base 20 to evenly distribute the weight of the drill such that the cart 10 may be tipped back onto the wheels for movement but provide a stable upright position resting on the forward base 20. The forward base 20 additionally incorporates a relief 48 positioned relative to a chuck or nose portion 50 of the orbital drill for clearance in handling.

As seen in FIG. 3, the rear surface 38 of the body 12 incorporates a toe relief 52 upwardly spaced from the lower rear edge 16 allowing a user to place a toe into the body to stabilize and provide additional leverage in tilting the cart 10 rearward onto the wheels 14. An overcenter prevention tongue 54 is telescopically inserted through the body 12 to provide a removable trap door 55 which covers the relief 48 in the forward base 20 and protrudes rearward from the rear surface 38 proximate the lower rear edge 16 to contact the ground at a predetermined angle of the body to prevent the cart 10 from falling to the rear.

Figure 4A:
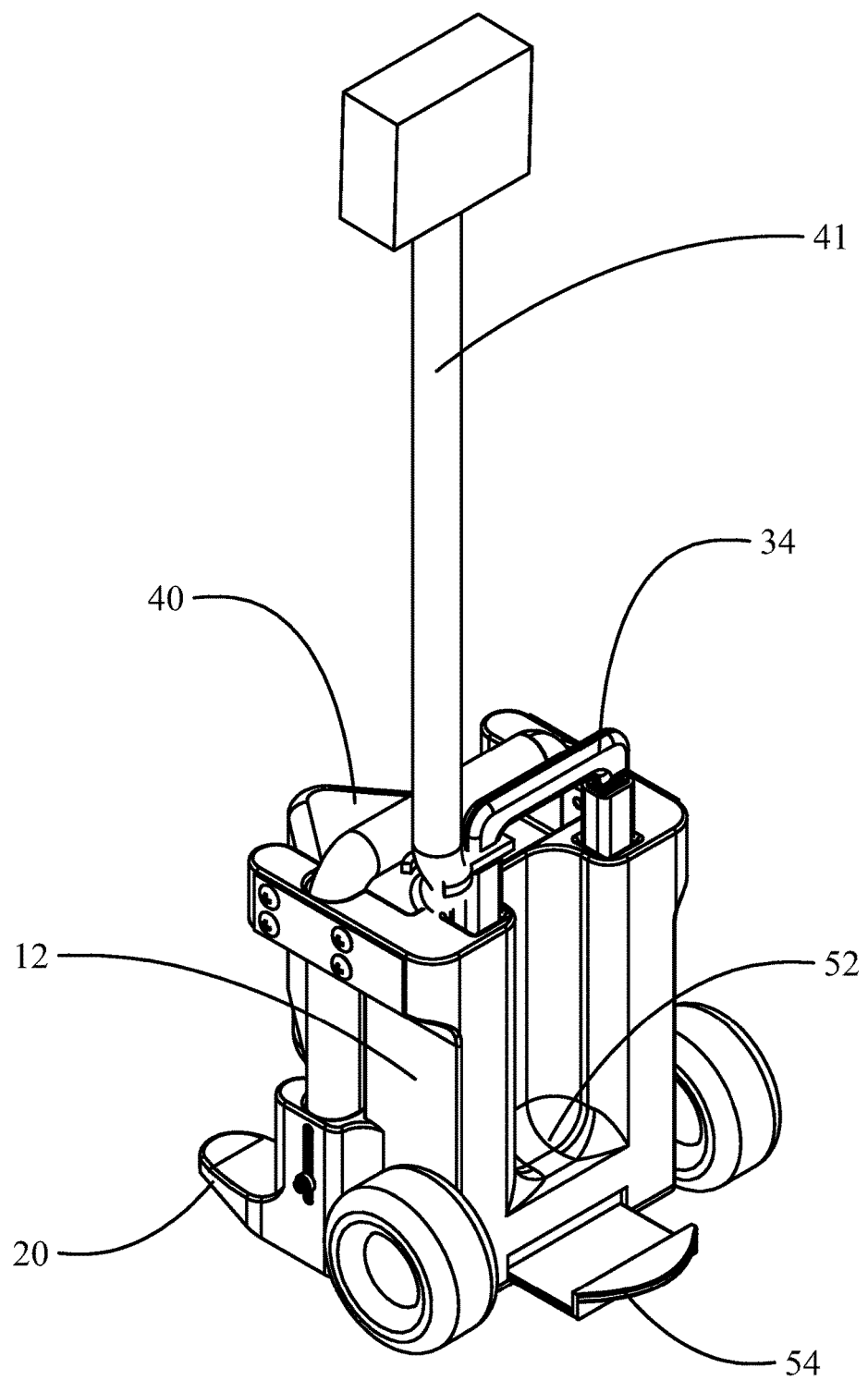
FIG. 4A is a rear pictorial representation as in FIG. 3 but with the handle retracted and the orbital drill inserted.
Figure 4B:
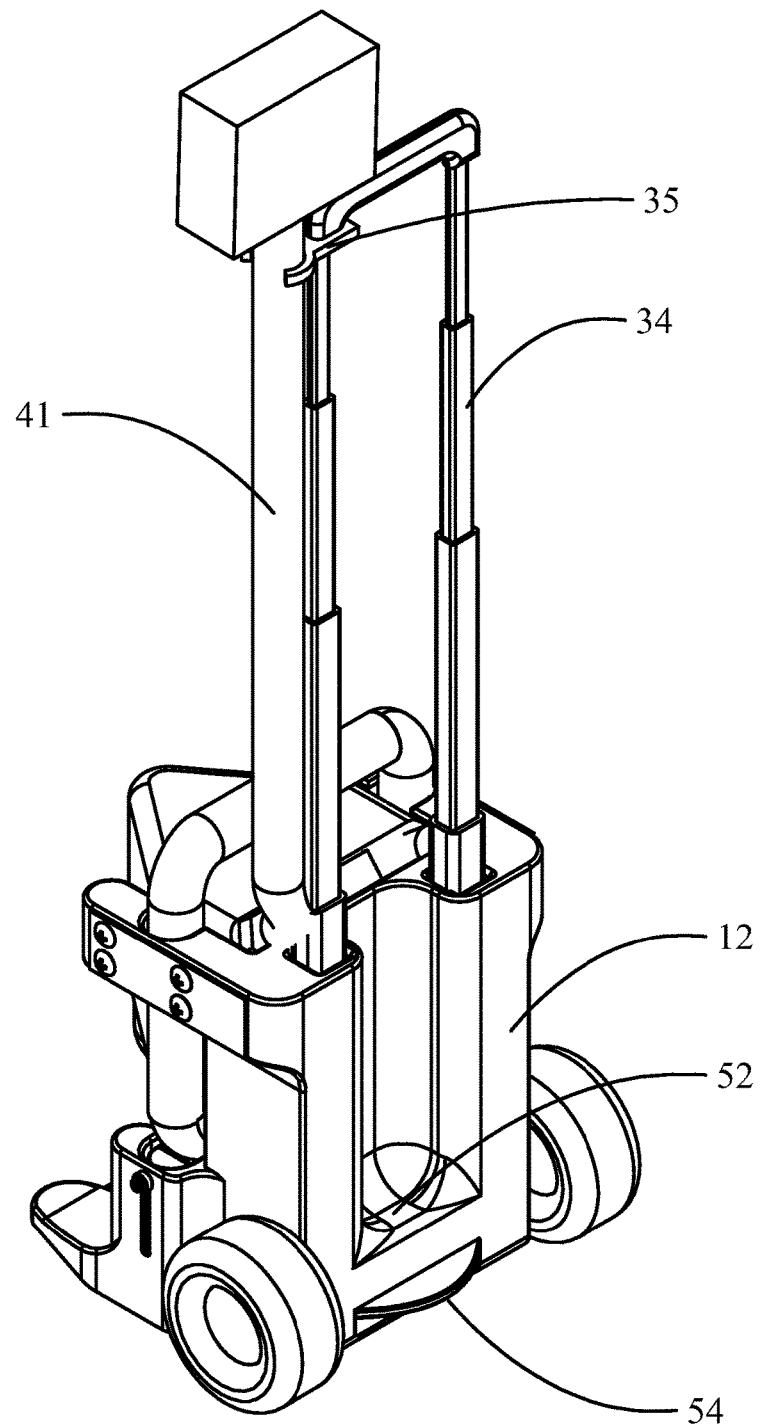
FIG. 4B is a rear pictorial representation as in FIG. 3 but with the handle extended after insertion of the orbital drill.
Figure 4C:
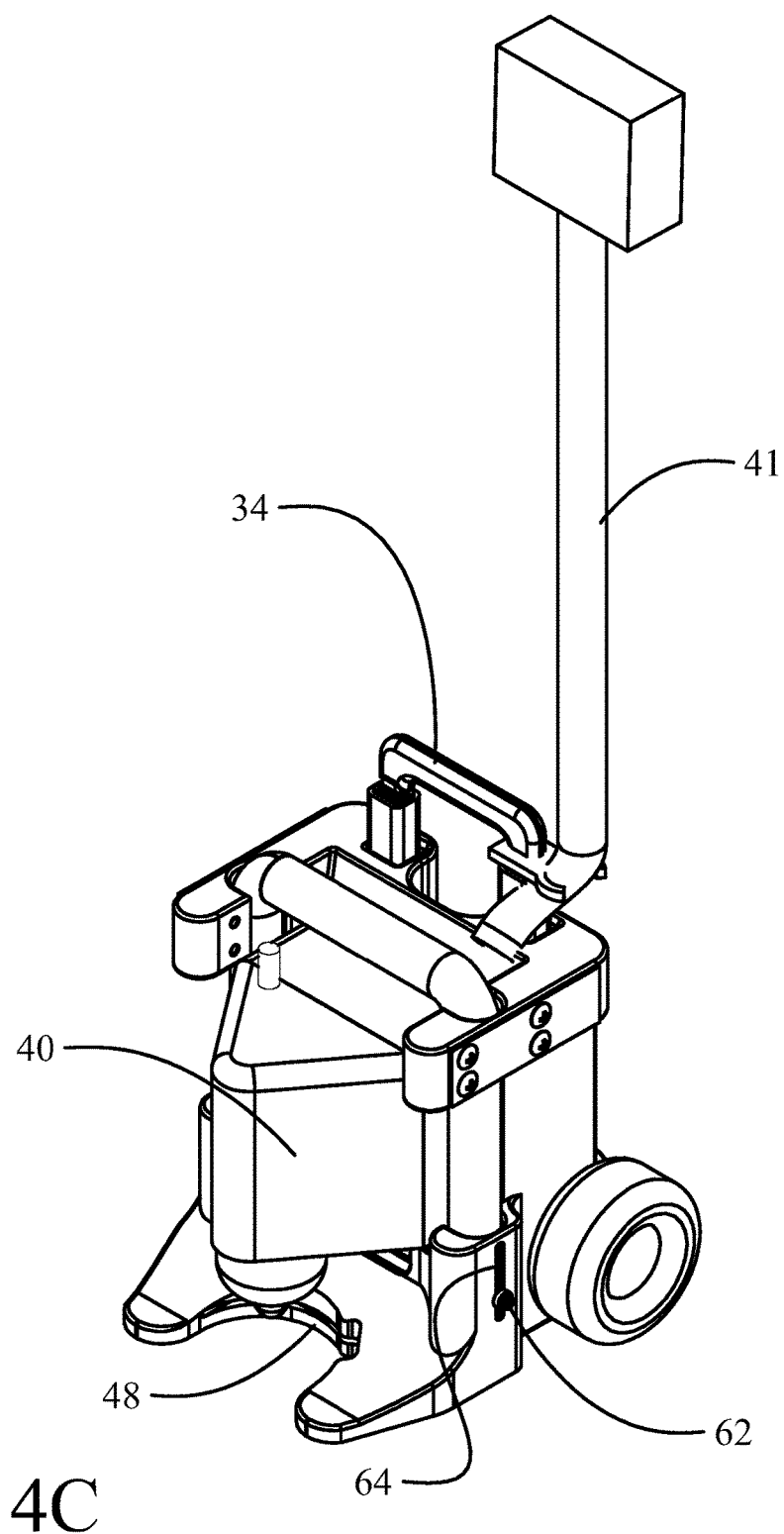
FIGS. 4C and 4D are front pictorial representations of FIGS. 4A and 4B, respectively.
Figure 4D:
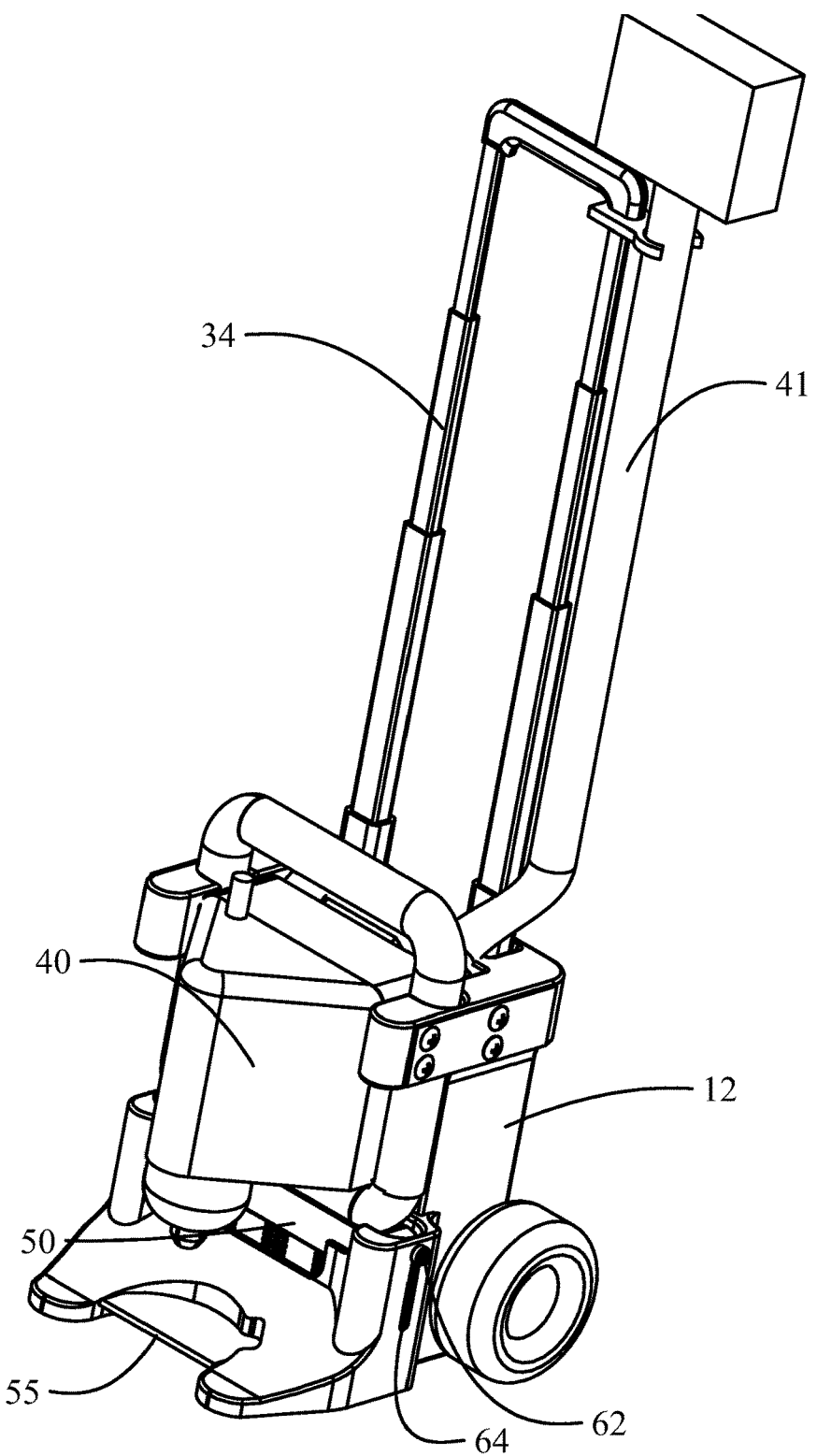

As seen in FIGS. 4A through 4C, the handle is telescopically retractable into the body 12 (FIGS. 4A and 4C) in a first position to allow clearance for easy access to the body for insertion of the drill 40 onto the cart 10. The overcenter prevention tongue 54 is telescopically extended and retracted through the rear surface 38 into the body 12 opposite the forward base 20 to provide greater stability while loading the drill 40. In the extended position of the overcenter protection tongue 54 the trap door 55 is retracted into the body 12 opening the relief 48 (as seen in FIG. 4C) allowing access to the drill nose portion 50 and operation of the drill 40. The extension of the overcenter prevention tongue 54 may be mechanically interconnected to the handle 34 to extend when the handle retracts. However, in the exemplary embodiment as shown, the overcenter prevention tongue is separately operable to allow opening of the trap door 55 with the handle 34 retracted or extended. As seen in FIGS. 4B and 4D the handle 34 telescopically extends to a second position to allow easy manipulation of the cart 10 to tilt and roll the cart with a longer moment arm with respect to the body 12.

Figure 5:
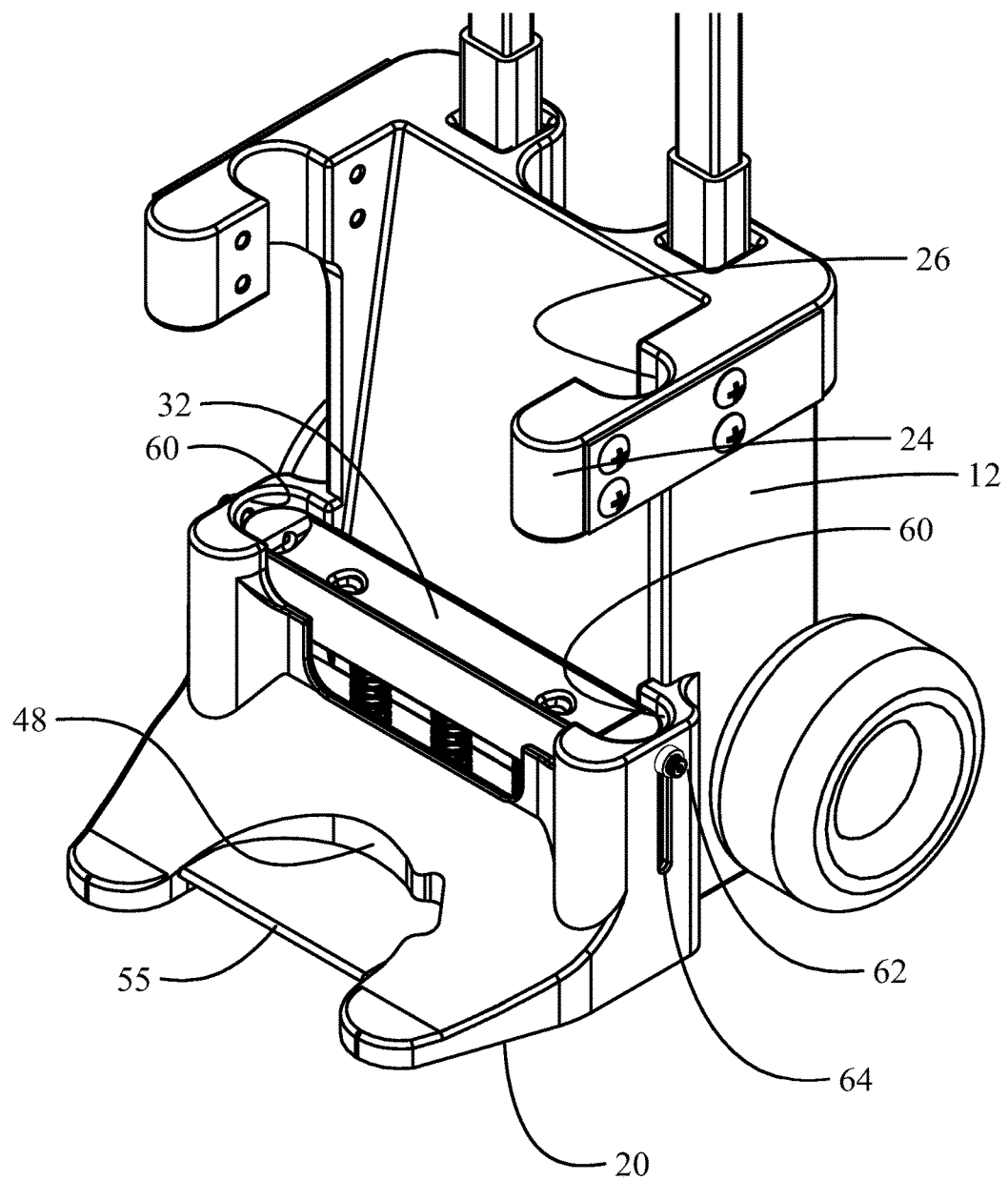
FIG. 5 is a front left pictorial representation of an embodiment of the tool hand cart with a resilient nose support for the orbital drill.
Figure 6:
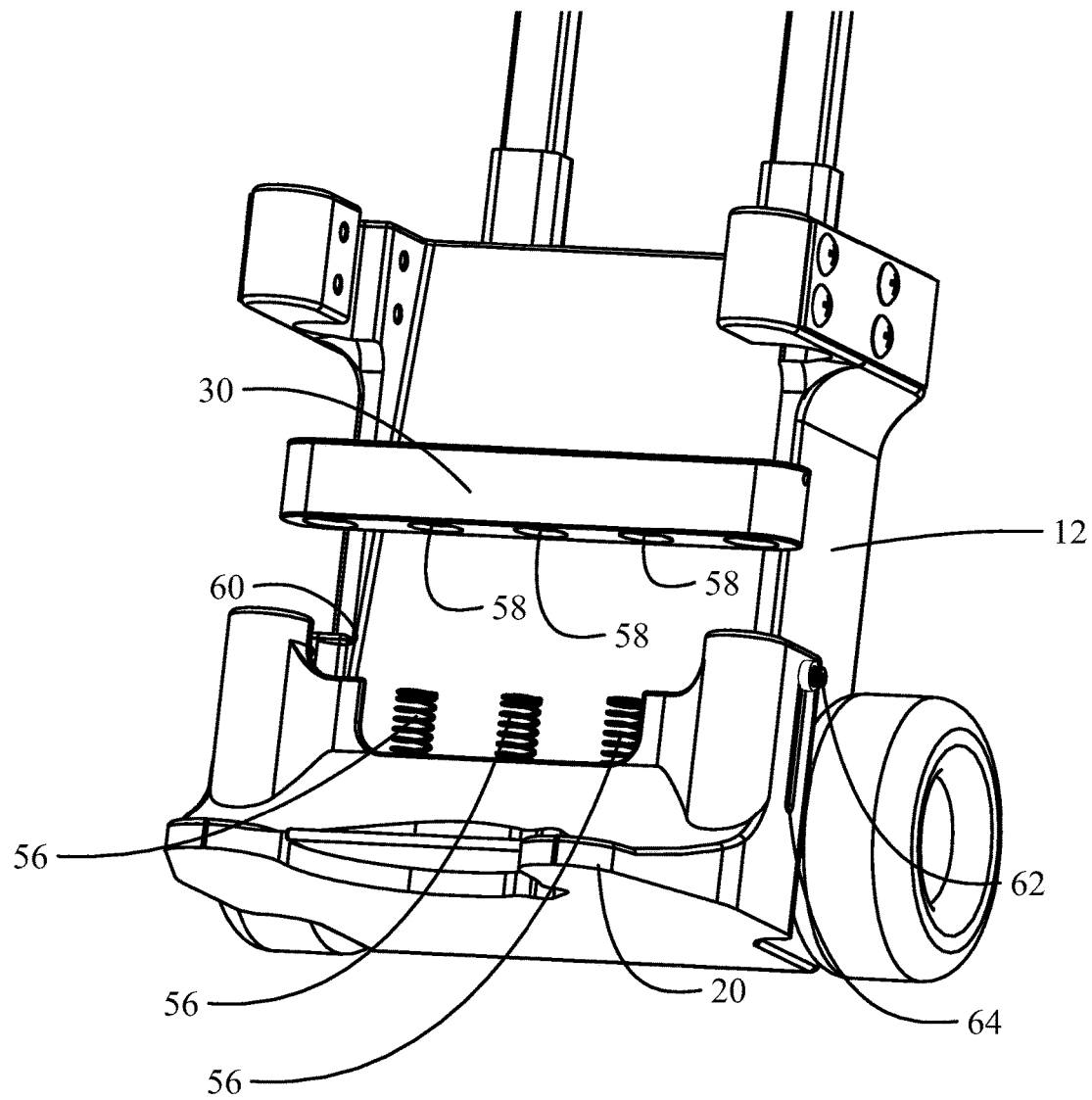
FIG. 6 is a front left pictorial representation of the embodiment of the tool hand cart of FIG. 5 with the nose support exploded to show the resilient elements; and, FIG. 7 is a flow chart of a method for implementing the disclosed embodiments.

Details of the resilient nose support 30 of the cart 10 is shown in FIGS. 5 and 6. The nose support 30 is resiliently mounted to the base 20. The resilient mounting allows reciprocation of the nose support 30 perpendicular to the base 20 and provides a biasing force to support the bottom member 44 of the drill when the side members 42 of the drill frame are received within the opposing first and second slots. As seen in FIG. 6, the resilient support for the nose support 30 is a plurality of springs 56 (five for the exemplary embodiment) engaged in bores 58 in the nose support. The nose support 30 is received in vertically oriented bottom channels 60 in the base 20. In the exemplary embodiment, the bottom channels 60 are aligned with the channels 26 in the arms 24. Stabilizing tabs 62 may extend from the nose support 30 through slots 64 interconnected with the bottom channels to further restrict motion of the nose support to a vertical plane. The stabilizing tabs additionally may be locked to provide limitation of the compression of the resilient elements, springs 56, for vertical positioning of the drill in the cart 10. As seen in FIGS. 2 and 4A and 4C the drill 40 is positioned with minimal compression of the springs and in FIGS. 4B and 4D in a compressed condition to lower the drill into the base relief 48 for operation of the drill or to lower the center of gravity.

Figure 7:
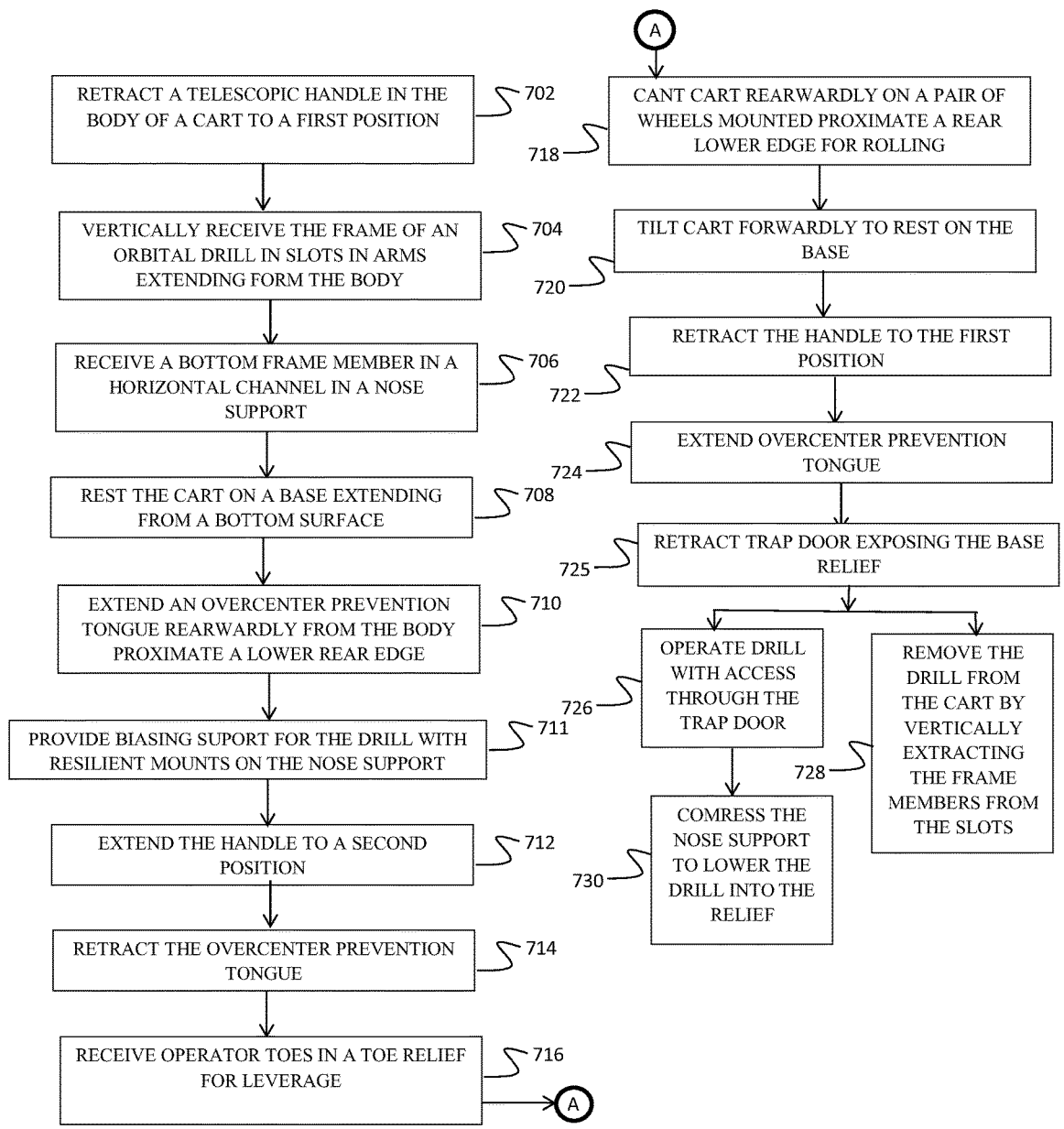

The embodiments herein provide a method for ergonomically moving an orbital drill. As seen in FIG. 7, a telescopically retractable handle in the body of a cart is retracted to a first position, step 702. A frame of an orbital drill is vertically received in slots in arms extending from the body of the cart, step 704, and a bottom frame member is received in a horizontal channel in a nose support, step 706. The cart rests with stability on a base extending form a bottom surface of the cart, step 708, and an overcenter prevention tongue may be extended rearwardly from the body proximate a lower rear edge for added stability, step 710. Additionally, the nose support may be resiliently mounted to the base for reciprocal motion substantially perpendicular to the base to provide biasing support for the nose portion of the drill during loading, step 711. The handle is telescopically extended to a second position, step 712, and the overcenter prevention tongue is retracted, step 714. A toe relief receives the toes of an operator for leverage, step 716 and the cart is canted rearwardly on a pair of wheels mounted proximate a lower rear edge of the body for rolling transport of the orbital drill, step 718. Upon reaching a desire location, the cart is tilted forwardly to rest on the base, step 720. The handle is retracted to the first position, step 722, and the overcenter prevention tongue is extended, step 724, retracting the trap door exposing the base relief, step 725. The orbital drill may operated while in the cart with access through the trap door, step 726, or removed from the cart by vertically extracting the frame members from the slots in the arms, step 728. The nose support may be compressed onto the resilient members to lower the drill into the relief for operation, step 730.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A tool hand cart comprising:
   a body;
   a pair of wheels rotatably mounted on opposite sides of the body proximate a lower rear edge of the body;
   a pair of arms having vertically oriented channels, said arms extending from a front of the body and arranged in spaced relation to define opposing first and second slots configured to receive side frame members of a drill;
   a nose support extending from a bottom portion of the body, the nose support mounted for resilient reciprocation in a direction perpendicular to a base with at least one spring providing a biasing force to support a bottom frame member of the drill when the side frame members of the drill are received within the opposing first and second slots; and,
   a collapsible handle, retractably extendable upward from the body, the handle retractable to a first position enhancing insertion of the drill and extendible to a second position and the body is configured to tilt from an upright standing position to a canted position in which the body is supported by the pair of wheels and rolled by pulling the handle to thereby transport the drill positioned in the first and second slots.

2. The tool hand cart of claim 1 further wherein the nose support has a substantially horizontal channel aligned with the vertically oriented channels to receive the bottom frame member of the drill.

3. The tool hand cart of claim 2 wherein the vertically oriented channels and horizontal channel are semicylindrical.

4. The tool hand cart of claim 1 further comprising a forward base extending from the body substantially flush with a bottom surface of the body and opposite from the wheels.

5. The tool hand cart of claim 4 wherein the base incorporates a trap door covering a relief in the base, said trap door retractable to expose the relief enabling handling and operation of the drill.

6. The tool hand cart of claim 5 further comprising an overcenter prevention tongue protruding from a rear surface of the body proximate the lower rear edge.

7. The tool hand cart of claim 6 wherein the overcenter prevention tongue is telescopcially extendible from the rear surface.

8. The tool hand cart of claim 7 wherein the trap door is integral with the overcenter prevention tongue and extension of the overcenter prevention tongue retracts the trap door.

9. The tool hand cart of claim 1 further comprising a toe relief in rear surface of the body upwardly spaced from the lower rear edge.

10. The tool hand cart of claim 1 further comprising a clip extending laterally from the handle for support of an umbilical extending from the drill.

11. A method for ergonomically moving an orbital drill comprising:
    retracting a telescopically retractable handle into a body of a cart to a first position;
    receiving a frame of an orbital drill vertically in slots in arms extending from the body of the cart;
    receiving a nose portion of the orbital drill in a shroud mounted to a base with resilient members for reciprocal motion substantially perpendicular to the base to provide biasing support for a nose portion of the drill during loading;
    resting the cart with stability on a base extending from a bottom surface of the cart;
    extending the handle telescopically to a second position;
    receiving toes of an operator in a toe relief for leverage; and,
    canting the cart rearwardly on a pair of wheels mounted proximate a lower rear edge of the body for rolling transport of the orbital drill.

12. The method for ergonomically moving an orbital drill as defined in claim 11 further comprising receiving a bottom frame member in a horizontal channel in a nose support.

13. The method for ergonomically moving an orbital drill as defined in claim 11 further comprising extending an overcenter prevention tongue rearwardly from the body proximate a lower rear edge for added stability.

14. The method for ergonomically moving an orbital drill as defined in claim 13 further comprising inserting an umbilical extending from the orbital drill in a clip extending laterally from the handle for support.

15. The method for ergonomically moving an orbital drill as defined in claim 14 further comprising retracting the overcenter prevention tongue prior to canting the cart.

16. The method for ergonomically moving an orbital drill as defined in claim 11 further comprising:
    tiling the cart forwardly to rest on the base upon reaching a desired location;
    retracting the handle to the first position; and,
    removing the orbital drill from the cart by vertically extracting the frame from the slots in the arms.

17. The method for ergonomically moving an orbital drill as defined in claim 16 further comprising extending an overcenter protection tongue.

18. The method for ergonomically moving an orbital drill as defined in claim 15 further comprising:
    tiling the cart forwardly to rest on the base upon reaching a desired location; and
    retracting a trap door exposing a relief in the base.

19. The method ergonomically moving an orbital drill as defined in claim 18 wherein the step of extending the overcenter prevention tongue retracts the trap door to open the relief in the base.

20. The method for ergonomically moving an orbital drill as defined in claim 18 further comprising compressing the nose support onto the resilient members lowering the orbital drill into the relief in the base.

* * * * *